SEMICONDUCTOR SATURATING REACTOR PULSERS

Filed April 5, 1960 2 Sheets-Sheet 1

INVENTORS
Barry W. Poehlman and
Joseph E. Sunderlin.
BY Marry I. Hull
ATTORNEY

United States Patent Office 3,211,915

Patented Oct. 12, 1965

3,211,915
SEMICONDUCTOR SATURATING REACTOR PULSERS

Barry W. Poehlman, Linthicum, and Joseph E. Sunderlin, Baltimore, Md., assignors to Westinghouse Electric Corporation, East Pittsburgh, Pa., a corporation of Pennsylvania Filed Apr. 5, 1960, Ser. No. 20,066
3 Claims. (Cl. 307—88)

This invention relates to improvements in pulse generators, and more particularly, to pulse generators in which semiconductor switches and saturable reactors are combined to produce a highly efficient and very versatile pulse generating apparatus.

Prior art saturable reactor pulse generating circuits, in general, have the desirable characteristics of ruggedness and reliability, but the pulse repetition rate cannot be easily varied and is usually the same as the frequency of an alternating current supply source or some multiple of this frequency. It is old in the art to combine saturable core devices with electronic devices, such, for example as a thyratron, to provide a controllable repetition rate under the control of a separate triggering circuit, and to provide a magnetic pulse generating circuit which works from a direct current supply. However, the use of thyratrons results in considerable power dissipation and loss in the circuit, thereby placing a limit upon the efficiency which may be obtained and introducing other disadvantages which will be set forth more fully hereinafter.

The apparatus of the instant invention overcomes these and other disadvantages of the prior art by employing semiconductor switching devices, for example, transistors, hyperconductive diodes, or other semiconductor devices to eliminate the undesirable power dissipation which results when a thyratron is used to control the charging and discharging of capacitors which form and sharpen the pulses. The circuits of the instant invention permit voltage step-up to be obtained, and some embodiments thereof provide for the use of hold-off diodes in series with the charging inductance permitting the operation of the circuit from an alternating current power source, or while used in conjunction with a direct current supply source allow a variable repetition rate.

Accordingly, a primary object of the instant invention is to provide new and improved pulse generator apparatus.

Another object is to provide new and improved pulse generator apparatus employing semiconductor devices for controlling the flow of currents which cause the generation of the pulses.

Another object is to provide a new and improved pulse generating and sharpening circuit employing the combination of a semiconductor switching device and saturable cores to provide a highly efficient and versatile pulse generating and sharpening circuit.

These and other advantages will become more clearly apparent after a perusal of the following specification, when read in connection with the accompanying drawings, in which.

Figure 1:
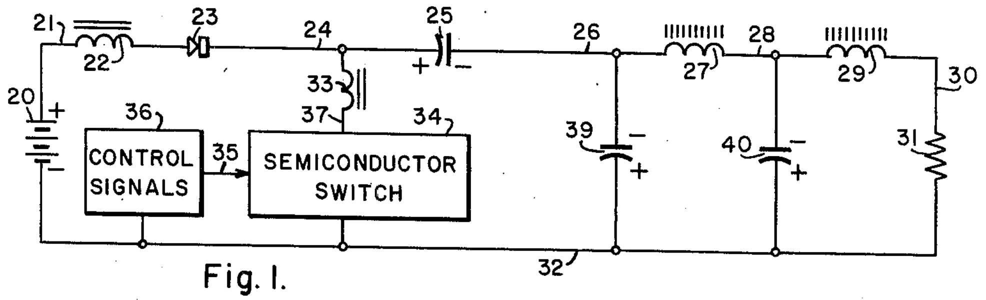
FIGURE 1 is a schematic electrical circuit diagram of the invention according to the preferred embodiment thereof.

Referring now to the drawings for a more detailed understanding of the invention, in which like reference characters are used throughout to designate like parts, and in particular to FIG. 1 thereof, there is shown at 20 a source of direct current potential, having connected between the positive and negative terminals thereof a circuit including lead 21, inductor 22, diode 23, lead 24, capacitor 25, lead 26, saturable core reactor 27, lead 28, saturable core reactor 29, lead 30, resistor or other load 31, and lead 32. Connected between the aforementioned lead 24 and the aforementioned lead 32 is a circuit including linear or unsaturable inductor 33, lead 37 and semiconductor switch 34. The semiconductor switch 34 has connected thereto by lead 35 a control pulse or trigger source 36, which may be dispensed with where switch 34 is a hyperconductive diode, as will be seen.

Figures 2, 3:
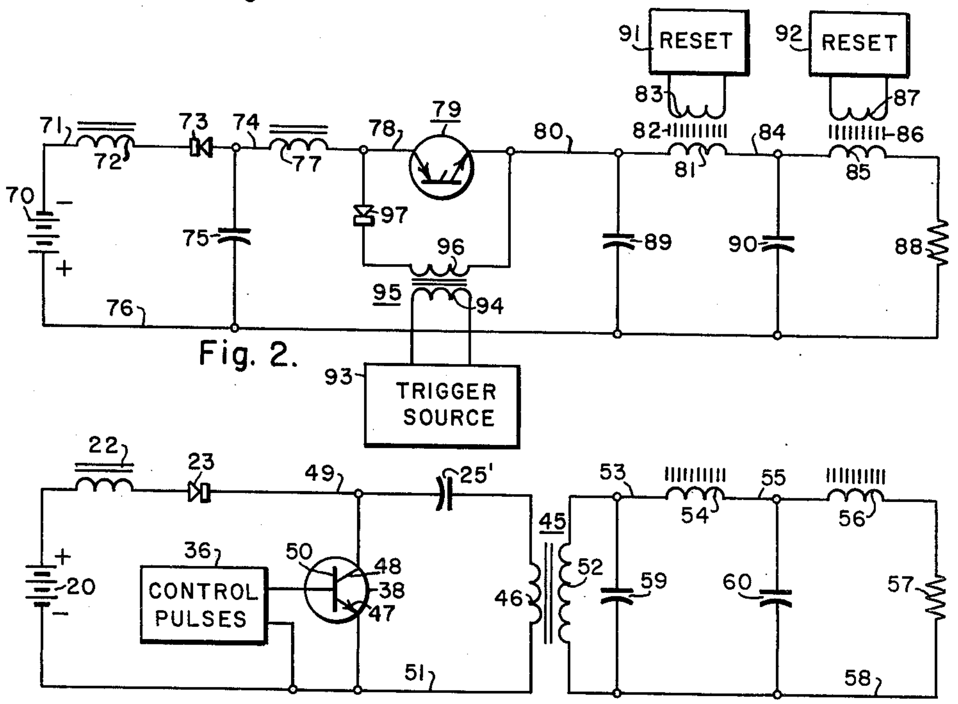
FIGS. 2, 3 and 4 are schematic electrical circuit diagrams according to other embodiments of the invention.

Let it be assumed for purposes of describing the operation of the circuit of FIG. 1 that the semiconductor switch 34 is a transistor, that lead 37 is connected to the collector of the transistor in a manner similar to that shown in connection with the transistor 38 of FIG. 3, and that the source of control signals 36 is a rectangular pulse generator of predetermined pulse width connected between the emitter and base of the transistor in a manner similar to that shown in FIG. 3. It will be understood that while a pulse of suitable polarity is applied between the base and emitter of the transistor, the transistor is rendered conductive and current flows between the collector and emitter thereof, and upon the termination of the control pulse applied between the base and emitter, the circuit through the transistor is opened.

Preferably inductor 22 has a greater inductance value than inductor 33.

Lead 26 is shown in FIG. 1 to have capacitor 39 connected therefrom to lead 32, whereas lead 28 is shown to have capacitor 40 connected therefrom to lead 32.

The saturable reactors 27 and 29 consist of a number of turns or a number of different sets of turns of wire enclosing a magnetic core having a "square-loop" hysteresis characteristic. The reactor presents a relatively large inductance in the unsaturated condition and a very low inductance while saturated, saturation occurring when the magnetizing force, which is proportional to the product of the number of turns times the current, exceeds a certain value whose magnitude and polarity are dependent upon the previous state of the magnetic material. For the purposes of the following description, positive saturation is defined as the low impedance condition of the reactor 27 or 29 produced by current flowing from left to right as seen in FIG. 1 (and 3), while negative saturation is produced by current flowing from right to left in FIGS. 1 and 3.

The circuit of FIG. 1 may be thought of as including three meshes, the first mesh comprising capacitor 25, inductor 33 and capacitor 39, the second mesh comprising capacitor 39, saturable reactor 27, and capacitor 40, and the third mesh comprising capacitor 40, saturable reactor 29, and resistor 31.

Assume for the purposes of describing the operation of the circuit of FIG. 1 that saturable reactors 27 and 29 are in a state of positive saturation when the direct current source 20 is connected to the circuit, in effect short circuiting capacitors 39 and 40 with the relatively low impedance load 31. Assume also that switch 34 is open.

Current from the source 20 will flow through lead 21, inductor 22, diode 23 and lead 24 to charge the capacitor 25. Since the cores of inductors 27 and 28 are saturated, the impedances offered to the flow of current by these devices are extremely low, and current flows into the capacitor 25 through the inductors 27 and 29, load resistor 31 and lead 32, charging capacitor 25 to approximately twice the supply voltage, in the theoretical lossless case. The input charging circuit is seen therefore to consist primarily of inductor 22 and capacitor 25. The theory and analysis of this type of charging circuit is discussed in more detail in a work entitled "Pulse Generators," by Glasoe and Lebacqz, being vol. 5 of the Radiation Laboratory Series, McGraw-Hill Book Company, Inc., 1948, pp. 356–363. Assume now by way of description that after or at the instant that the capacitor 25 is charged to its peak value, the semiconductor switch 34 is closed. When switch 34 is closed, capacitor 25 transfers its stored energy to capacitor 39. It does this in substantially the following manner: the closing of switch 34 causes the charge to begin flowing to the left through the lead 24, inductor 33, lead 37, switch 34, lead 32, capacitor 39, and capacitor 40 and inductor 27. Reactor 27 immediately transfers from the saturated to the unsaturated state as a result of current flow through the winding and becomes a high impedance effectively in series with capacitor 40, with the result that most of the charge from capacitor 25 is transferred to capacitor 39 with polarities as indicated in FIG. 1. The saturable reactor 27 is constructed and designed to reach negative saturation when the capacitor 39 becomes fully charged. In actuality, when switch 34 is closed, a small current starts to flow in the circuit mesh including load resistor 31 and inductor 29, but in describing the circuit of reactor 27 in particular, it should be noted that this reactor comes out of saturation before substantial current starts to flow in the other branch or mesh of the circuit, that is, inductor 27 comes out of saturation before inductor 29, and is designed to do this, so that the current flow in the other mesh or branch of the circuit may be neglected in the description of the apparatus. When the capacitor 39 becomes fully charged, the semiconductor switch 34 is turned off. The turn off of the semiconductor switch 34 is arranged and predetermined to coincide with the charging of the capacitor 39 by regulation of the width of the pulses from source 36. The purpose of the inductor 33 is to resonate with capacitors 25 and 39 thus causing complete transfer of the charge on capacitor 25 in a period of time dependent upon the time constant of the inductor and the capacitors; the inductor 33 also limits the peak charge transfer current to a value consistent with the capability of the semiconductor switch 34. The drop in impedance exhibited by reactor 27 when it reaches negative saturation causes the charge now stored on capacitor 39 to begin flowing to the right through reactor 29 by way of reactor 27, load 31 and lead 32. Reactor 29 immediately transfers to the unsaturated state, thus allowing most of the charge remaining on capacitor 39 to transfer to capacitor 40 with polarity as shown. Complete charge transfer in the transfer time is insured by the resonant circuit comprising capacitors 39 and 40 and the saturated inductance of reactor 27. The saturated inductance of reactor 27 is designed to be less than the inductance value of unsaturable inductor 33, thus producing a narrower pulse at capacitor 40 than previously appeared at capacitor 39. The saturable reactor 29 is designed to reach negative saturation when capacitor 40 becomes fully charged. The charge on this capacitor is thus caused to transfer to the load resistor 31 in the form of a voltage pulse whose width is determined by the value of capacitor 40, the saturated inductance of reactor 29, and load 31. The saturated inductance is designed to produce a narrower pulse than that previously appearing at capacitor 40. It can be seen that succeeding pulse sharpening meshes each consisting of a saturable reactor and associated capacitors cause the pulse width to be decreased in stepwise fashion as it is transferred from the charging circuit to the load. The efficient transfer of this pulse places a limit on the ratio of each succeeding pulse width. Thus additional pulse sharpening networks or meshes may be added if necessary to achieve the desired output pulse width.

Figure 5:
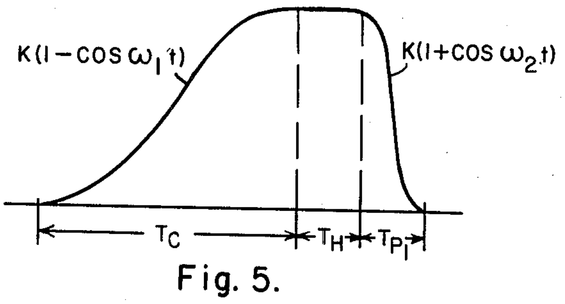
FIG. 5 is a graph illustrating the operation of the circuit of FIG. 1.
Figure 6:
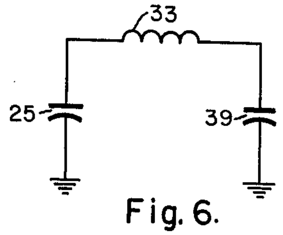
FIG. 6 is a schematic electrical circuit diagram helpful in describing the operation of the circuit of FIG. 1.

Particular reference is made now to FIG. 5 which shows the voltage on capacitor 25. $T_C$ represents the actual time to charge capacitor 25 to its peak value, $T_H$ represents what is known as holdoff time, and is explained more fully in the aforementioned volume entitled "Pulse Generators," and $T_{P1}$ is the discharge time of capacitor 25. The closing of the aforementioned semiconductor switch 34 at the beginning of the cycle of operation causes the formation of an equivalent circuit such as that shown in FIG. 6. As previously stated, at the instant the switch 34 is closed, capacitor 25 has been charged to the full voltage designated voltage $V_{25}$, and there is zero charge on capacitor 39. For the lossless case, assuming perfect components it can be shown that the voltage on capacitor 39 is given by the expression:

$$V_{39}=V_{25}\left(\frac{C_{39}}{C_{25}+C_{39}}\right)(1-\cos \omega t)$$

where $$\omega=\left(L_{33}\frac{C_{25}C_{39}}{C_{25}+C_{39}}\right)^{-1/2}$$

In general, the capacitance of 25 is equal to the capacitance of capacitor 39 so that $$V_{39}=\frac{V_{25}}{2}(1-\cos \omega t)$$

The time constant of this mesh is designed to be small compared with that of the charging mesh including inductor 22 and capacitor 25; since the inductance of 27 is smaller than 33, the inductance of 29 is smaller than 27, and since the capacitance of 25, 39 and 40 are substantially equal, it will be apparent that each succeeding mesh has a smaller time constant and hence pulse sharpening is obtained.

Figure 7:
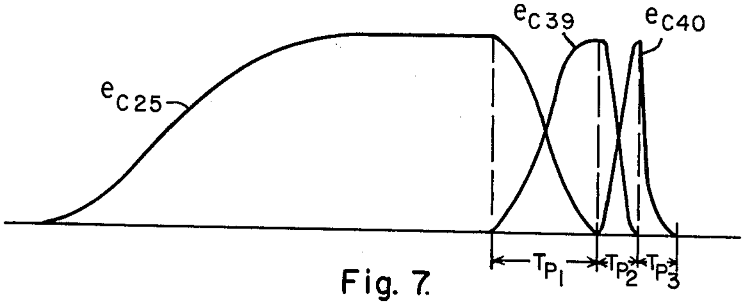
FIG. 7 is a graph additionally illustrating the operation of the circuit of FIG. 1.

Particular reference is made now to FIG. 7, in which a somewhat exaggerated depiction of the various voltage wave shapes are shown, these being exaggerated for clarity of illustration. $T_{P1}$ is the discharge time of capacitor 25, $T_{P2}$ is the discharge time of capacitor 39, and $T_{P3}$ is the discharge time of capacitor 40. Since capacitor 40 is shown discharging into a load resistor rather than a capacitor, its discharge wave shape will differ from that of the other capacitors, as shown in FIG. 7.

For a more detailed description of the transfer of energy from one capacitor to another by way of saturable reactors, reference may be had to an article entitled "The Use of Saturable Reactors as Discharge Devices for Pulse Generators," by W. S. Melville, appearing in Proceedings I.E.E., vol. 98, Part III, No. 53, May 1951, pp. 185–207.

Upon completion of the output pulse in load 31, it will be noted that both inductor 27 and inductor 29 are in negative saturation. When the switch 34 in FIG. 1 opens, the charging current of capacitor 25 from source 20 begins flowing through inductor 27 and inductor 29 in such a direction that these inductors are driven from negative to positive saturation. The circuit therefore resets itself, and after a brief time interval determined by the values of the circuit parameters, the circuit is in a condition upon reclosing of switch 34 to generate another sharp pulse in load resistor 31.

Particular reference should be made now to FIG. 3, in which a second embodiment of the invention is shown, in which a transformer generally designated 45 is provided for providing voltage stepup. The primary 46 of the transformer is seen to have one terminal thereof connected to the capacitor 25' and to have the other terminal thereof connected by way of lead 51 to the negative terminal of batttery 20, and also connected to the emitter 47 of the aforementioned transistor 38. The collector 48 of transistor 38 is connected to lead 49 which interconnects the aforementioned capacitor 25' and diode 23. Base 50 is connected to one terminal of a suitable control pulse source 36 which has the other terminal thereof connected to lead 51. The secondary 52 of transformer 45 has connected thereacross in series in the order named lead 53, saturable inductor 54, lead 55, saturable inductor 56, load resistor 57 and lead 58. Capacitor 59 is connected from lead 53 to lead 58, whereas capacitor 60 is connected from lead 55 to lead 58. A first circuit mesh includes capacitor 25', the leakage inductance of transformer 45, and capacitor 59; a second circuit mesh includes capacitor 59, reactor 54 and capacitor 60; a third circuit mesh includes capacitor 60, reactor 56, and resistor 57.

In the circuit of FIG. 3, the saturable inductors 54 and 56 correspond to inductors 27 and 29 respectively of FIG. 1, whereas capacitors 59 and 60 of FIG. 3 correspond to capacitors 39 and 40 of FIG. 1. Upon the closing of the circuit through the transistor 38 after capacitor 25' has been charged, the capacitor 25' discharges through the primary 46 and the stepped up voltage appearing in secondary 52 is stored in capacitor 59 in a manner somewhat similar to the storage of energy in capacitor 39 as described in connection with FIG. 1. It will be noted that the transformer 45 is not a saturable core device, in the embodiment shown, therefore the secondary preferably presents a high impedance at all times, and is designed to do so to the capacitor 59 resulting in a minimum amount of drain of charge from the capacitor 59. Furthermore, in FIG. 3 the leakage inductance of transformer 45 performs the function of inductor 33 of FIG. 1.

Figure 8:
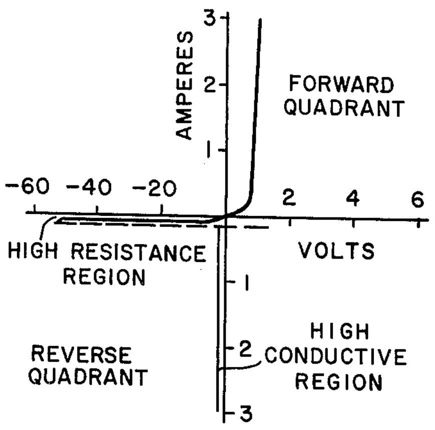
FIG. 8 is a characteristic curve of a suitable hyperconductive diode for use in several embodiments of the invention.

Particular reference is made again to FIG. 1. As previously stated in connection with the description of the figure, the semiconductor switch 34 may take one of several forms. Assume for the purposes of discussion that the semiconductor switch is replaced by a two terminal hyperconductive diode such, for example, as that shown and described in a copending application of John Philips for "Semiconductor Diode," Serial No. 642,743, filed February 27, 1957, now Patent No. 2,953,693, and assigned to the assignee of the instant invention. The characteristic curve of this hyperconductive diode is shown in FIG. 8, where it will be seen that when a voltage is applied in a forward direction, the current is a function of the applied voltage although not a linear function, but when voltage is applied in the reverse direction, substantially no current flows, or more precisely the current does not increase with increasing voltage until a high value of applied voltage is reached, in the example shown of the order of 50 volts. At this voltage the semiconductor diode breaks down and assumes a hyperconductive condition where the current is substantially a straight line parallel to the current coordinate, and the current is substantially independent of the applied voltage, so that, after breakdown, the device has the qualities of a true switch.

Assume now that such a hyperconductive diode is connected in the circuit of FIG. 1 at 34, and the lead 35 dispensed with. As the circuit is put in operation and current from source 20 flows into the capacitor 25, the voltage on capacitor 25 builds up until it reaches a value equal to the breakdown voltage of the hyperconductive diode connected between leads 37 and 32, the terminals or polarity of the hyperconductive diode having been suitably chosen. When this value is reached, effectively the hyperconductive diode closes the circuit without substantial resistance, and the cycle of operation of the circuit as described hereinbefore proceeds in a normal fashion. At the conclusion of the cycle of operation, the circuit operates in a manner to remove the voltage from the hyperconductive diode, or reverse it in polarity, so that the hyperconductive device is turned off, or restored to a non-hyperconductive state.

Figure 9:
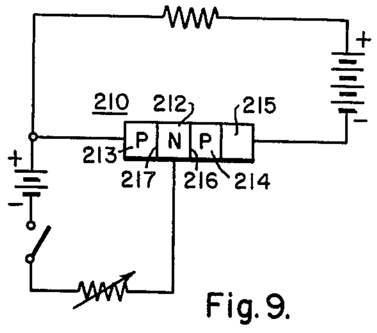
FIG. 9 is a schematic electrical circuit diagram illustrating the operation of a three terminal semiconductor switch which may be employed in one or more embodiments of the invention.

As previously stated in connection with FIG. 1, the semiconductor switch 34 may be a three terminal switching device such as that shown and described in the copending application by John Philips for "Semiconductor Transistor Switches," Serial No. 649,038, filed March 28, 1957, now Patent No. 3,141,119, and assigned to the assignee of the instant invention. This device is somewhat similar to a thyratron; for a given bias potential the device does not become highly conductive until a certain critical applied voltage is reached, whereupon the resistance of the device falls to an exceedingly low value and full current flows. In the device described in the copending application, this critical voltage may be varied within limits by varying the bias on a third terminal. Also, a pulse applied to the third terminal may be used to trigger the device. FIG. 9 shows the semiconductor switch generally designated 210, of the last-named copending application, connected in a simple illustrative circuit. Main current conduction takes place between emitter 213 and second base 214. The bias applied to first base 212 controls the critical firing voltage. Junctions are designated 217 and 216, while 215 designates a mass of metal for providing carriers. The characteristics of this three terminal semiconductor switch are such that the current through the device may be terminated by reversing the potential on the device, or it may more desirably also be terminated by causing the reverse current to fall to zero for an instant. One junction of the switching device 210 has characteristics somewhat similar to the aforedescribed hyperconductive diode, which as previously stated, exhibits a breakdown similar to that of a neon tube, that is, it blocks the flow of load current until a critical voltage is reached. Any further increase in voltage results in a sharp voltage breakdown where the device voltage drops to a very small value and a high current flows. The three terminal device 210 behaves very similar to a hyperconductive diode with a variable breakdown voltage. If a reverse potential is applied to a circuit between the mass of metal and the first conductive zone with no voltage being applied to the base contact, the semiconductor switching device will be so highly resistant that up to a predetermined point less than a milliampere of current will flow even at substantial voltage; however, as the reverse voltage is increased there is reached a point at which a critical current and voltage is applied and the semiconductor device will suddenly become hyperconductive, so that a potential which is very small will sustain a high current of up to a number of amperes. This hyperconductive point may be varied in any particular device so as to occur at, for example, 45 to 150 volts reverse potential. By applying a small biasing potential to the first base 212, the hyperconductive or breakdown point can be controlled so as to occur at various reverse potentials and currents. A biasing current of the order of 1 to 3 milliamperes has been found effective to cause hyperconductive breakdown to occur as desired. As previously stated, characteristics of this switch are such that once the hyperconductive state occurs, reverse current will flow without further biasing current being applied.

The device of FIG. 9 may be employed for the semiconductor switch 34 of FIG. 1. After capacitor 25 is fully charged, a trigger is applied from trigger generator 36, closing the switch 34. The trigger may be of brief duration; once the three terminal semiconductor switch becomes hyperconductive it remains so until the potential thereacross falls to zero or reverses in polarity, at which time the charge has been fully transferred.

Particular reference is made now to FIG. 2 in which there is shown a series circuit arrangement for transferring pulse energy from one capacitor to another with a resultant decrease in pulse width and sharpening of the pulse. FIG. 2 is seen to have a direct current source of potential 70 having connected thereacross in series in the order named lead 71, inductor 72, diode 73, lead 74, capacitor 75 and lead 76. Connected to lead 74 is one terminal of an inductor 77 which corresponds to the inductor 33 of FIG. 1, the other end of the inductor 77 being connected by lead 78 to one terminal of a hyperconductive diode 79, the other terminal of the hyperconductive diode 79 being connected by lead 80 to one winding 81 of a saturable transformer having a core 82 and an additional winding 83, the other end of winding 81 being connected by way of lead 84 to one terminal of one winding 85 of an additional saturable transformer having core 86 and additional winding 87. The other terminal of winding 85 is connected by way of load resistor 88 to the aforementioned lead 76. Lead 80 has capacitor 89 connected therefrom to lead 76, whereas lead 84 has capacitor 90 connected therefrom to lead 76. The aforementioned windings 83 and 87 have sources of reset potential 91 and 92 connected thereto respectively. A source of triggering pulses 93 is provided supplying pulses to the primary 94 if a transformer 95 having the secondary 96 thereof with one terminal connected to the aforementioned lead 80 and the other terminal connected by way of rectifier 97 to the aforementioned lead 78. The source of pulses 93 is provided for triggering the hyperconductive diode 79, which may have a characteristic similar to that shown in FIG. 8, between the non-hyperconductive and hyperconductive states.

In the operation of the circuit of FIG. 2, it will be understood that when the hyperconductive diode 79 is triggered into a hyperconductive state, the capacitor 75, which has been charged from source 70, discharges through inductor 77 and hyperconductive diode 79 into capacitor 89, transferring its charge to capacitor 89. From thence the operation of the circuit to provide a sharpened pulse in load resistor 88 is similar to that described in connection with FIG. 1, with the exception that a reverse current from source 70 cannot flow through the loop at the conclusion of the cycle to reset the cores 82 and 86 to positive saturation, so that it is necessary to provide reset windings 83 and 87, which are energized from their respective reset sources 91 and 92 to reset the cores 82 and 86 for the next cycle of operation. The advantage of the series circuit of FIG. 2 over that of FIG. 1 is that the semiconductor switch, shown as a hyperconductive diode 79, does not carry current from the battery 70 via inductor 72 in addition to the charge transfer current, as it does in the shunt arrangement. However, the charging current for capacitor 75 does not flow through the reactor windings 81 and 85, so that an external reset from sources 91 and 92 must be applied to the reactors to cause them to be in positive saturation at the beginning of each cycle, as previously explained. This reset may be in the form of a fixed bias current. It will be noted also that in the series circuit of FIG. 2 no terminal of the semiconductor switch 79 is connected to the common lead 76. Accordingly, the external trigger from source 93 is supplied through the isolation transformer 95.

Figure 4:
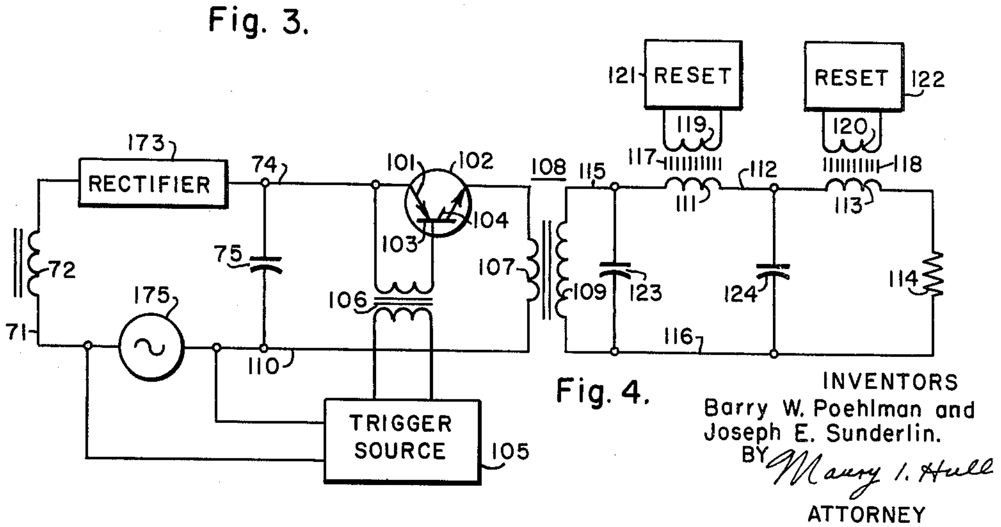

Particular reference is made now to FIG. 4, which is somewhat similar to both FIGS. 2 and 3; an alternating current source 175 is employed, which charges capacitor 75 through rectifier 173, the polarity of rectifier 173 being selected in accordance with terminal choice of three terminal switch 102; the three terminal semiconductor switch 102 (or 210) is shown in series circuit for controlling the flow of current from the capacitor 75, and also a transformer for providing voltage step-up is shown interconnected between the three terminal switch 102 and the capacitors 123 and 124 which are used in the pulse sharpening operation. In FIG. 4, lead 74 is connected to one element 101 of a semiconductor switch generally designated 102 having additional elements 103 and 104. A triggering source 105 is provided, applying its output by way of transformer 106 between the aforementioned terminals 103 which may be a first base, and 101 which may be an emitter. The trigger repetition frequency, and hence the pulse repetition frequency, should be the same as, or a submultiple of, the frequency of source 175. This can conveniently be obtained by synchronizing 105 with source 175. Terminal 104 is connected to the primary 107 of a transformer generally designated 108, having secondary 109. The other end of primary 107 is connected by way of lead 110 to the aforementioned alternating current source 175. Across secondary 109 there is connected in series in the order named lead 115, winding 111, lead 112, winding 113, resistor 114, and lead 116. The windings 111 and 113 have saturable cores 117 and 118 associated therewith respectively with reset windings 119 and 120 respectively connected to reset sources 121 and 122 respectively. Lead 115 has capacitor 123 connected therefrom to lead 116, whereas lead 112 has capacitor 124 connected therefrom to lead 116, capacitor 75, the leakage inductance of transformer 108, and capacitor 123 forming a circuit mesh. A second circuit mesh is formed by capacitor 123, inductor 111, and capacitor 124, while a third circuit mesh is formed by capacitor 124, inductor 113, and resistor 114.

The operation of the circuit of FIG. 4 will be readily understood in the light of the operation of the circuits of FIGS. 2 and 3 heretofore given in detail. The three terminal semiconductor switch generally designated 102 has the breakdown point thereof under the control of pulses from trigger source 105 applied between the elements 101 and 103 which correspond to the elements 213 and 212 of FIG. 9. While the circuit is opened at 102 the capacitor 75 charges from source 175, and when the capacitor 75 has reached its full charging potential, the circuit is closed at 102 and capacitor 75 discharges through primary 107 inducing a greater voltage in secondary 109, and the rest of the pulse sharpening resulting from the operation of capacitors 123 and 124 and saturable devices having windings 111 and 113 is similar to that previously explained, to provide a sharpened pulse in the output load impedance 114. Reset potentials are applied from sources 121 and 122 for reasons which have been made heretofore apparent. It should be noted that in the circuits of FIGS. 3 and 4, mathematical calculations of pulse shapes require that the impedance transformation ratio of the transformer be taken into account.

The embodiments of FIGS. 3 and 4, in which step-up transformers are provided, are particularly suitable in applications requiring an output pulse voltage greater than that which can be handled by the semiconductor switch, for example, in a magnetron modulator, and the step-up transformers are accordingly used in these modifications or applications. In general, it may be said that pulse sharpening networks are smaller and more efficient when operated in higher voltage, lower current levels, and accordingly the pulse sharpening networks are preferably placed on the high voltage side of the transformer, as shown. The leakage inductance of the transformer may purposely be made comparable to the value required of inductor 33 and 77 in FIGS. 1 and 2, and accordingly this inductor may be eliminated in the step-up transformer arrangement, its functions being performed by the leakage inductance of the transformer. It should be noted that current flowing in the primary of the transformer is unidirectional in nature when the transformer is used in connection with a series circuit as depicted in FIG. 4; the transformer must therefore be capable of handling the current without saturating.

Various considerations which will readily occur to those skilled in the art may be taken account of in designing circuits for the purpose of obtaining fixed or variable pulse repetition rates using the various types of semiconductor switches and operating from either alternating or direct current power sources. The repetition rate is equal to the number of cycles of operation per second, and hence depends upon the rate at which the semiconductor switch is caused to turn on. The embodiments of FIG. 1 to 4 show provisions for applying an external gate or trigger to the switch and accordingly, the repetition rate is controlled externally and may be fixed or variable as desired. The upper limit of the repetition rate is fixed by the charging time of capacitor 25, 25' or 75, and it is apparent that the time period of each cycle may not be less than the charging time of this capacitor. Time periods greater than this charging time are permissible because of the holding action of the diode 23 or 73.

As has been previously stated, where a diode is employed at 23 and 73, an alternating current supply may be substituted for the batteries 20 and 70. Where an alternating current supply is provided, the cyclic time period is fixed and must be equal to, or an integral multiple of the period of one cycle of the supply frequency. If, for example, the alternating current supply is full-wave rectified before being applied to the charging circuit, the minimum allowable time period may be halved. With respect to the control of the semiconductor switches, where external control is applied as where a transistor 38 is employed as in FIG. 3, control is applied to the base element in the form of a gating current of sufficient magnitude and of the correct polarity to sustain the full charge transfer current passing through the collector junction. The control must be applied at the beginning of the cycle, and should be removed or caused to change in polarity when full transfer of the charge from capacitor 25 to capacitor 39 has taken place. In FIG. 3 the transistor is shown applied to a shunt circuit utilizing a step-up transformer.

In the hyperconductive diode arrangement of FIG. 2, the critical firing voltage of the hyperconductive diode must be greater than the peak charge voltage appearing on capacitor 75 so that diode 79 does not become hyperconductive until a trigger is applied. Turn on at the beginning of the cycle is accomplished externally by the application of a trigger voltage spike of correct polarity and of a magnitude which makes the potential across diode 79 greater than the hyperconductive diode critical firing voltage or breakdown voltage. Turn off is accomplished automatically at the appropriate time by the action of inductor 77, as previously explained, which tends to make a current start flowing in a reverse direction. The diode 97 in FIG. 2 isolates the transformer 95 and trigger source from the circuit except during the triggering period.

In the embodiment of FIG. 4, where a thre terminal semiconductor switch is shown in conjunction with a series circuit using a step-up transformer, the critical firing voltage of the three terminal semiconductor switch must be greater than the peak charging voltage appearing on capacitor 75. Turn on is accomplished externally by application of a relatively small voltage spike to the control element (first base) of the semiconductor switch from trigger source 105. As described above, turn off is accomplished automatically by leakage inductance of transformer 108 which causes the potential across switch 102 to reverse in polarity at the end of the charging period.

In applications where a fixed pulse repetition rate is required, this rate may be made synchronous with the charging rate of capacitor 25 or 75 by application of a synchronizing signal to the external trigger or gate source, this signal being derived in some means, as will be readily apparent to those skilled in the art, from the charging circuit or from a pulse forming network. The use of a hyperconductive diode or of a three terminal semiconductor switch operated as a two terminal device will allow the circuit to "run free" at a fixed rate determined by the charging rate of capacitor 25 or 75. In this mode of operation the hyperconductive diode or three terminal semiconductor switch must have a critical firing voltage equal to or slightly less than the peak charge voltage appearing on the capacitor and the external trigger may thus be eliminated.

There has been provided, then, apparatus well suited to accomplish the aforedescribed objects of the invention. The semiconductor switching devices employed have characteristics which approximate a true switch closely enough so that there is substantially no power loss in any of the arrangements shown resulting from the semiconductor switching device itself. Furthermore, in the embodiments shown in FIGS. 1 and 2 voltage step-up may be added or provided eliminating the necessity for high voltage semiconductor control devices; automatic reset is provided in certain embodiments of the invention, eliminating the necessity for special reset circuits; the various embodiments provide for easily controlled pulse repetition rates, and provide flexibility in that they may be operated from direct current or alternating current sources as desired. In summary, the embodiments of the invention all provide increased efficiency, flexibility and stability over prior art devices in which saturable core transformers have been used in conjunction with thyratrons for pulse generation.

Saturable core transformers may be used at 45 and 108, if desired.

Whereas the invention has been shown and described with respect to some embodiments thereof which give satisfactory results, it should be understood that changes may be made and equivalents substituted without departing from the spirit and scope of the invention.

We claim:

1. In a pulse generator, in combination, a source of direct current, switching circuit means including an inductor and a normally open semiconductor switch connected in series, circuit means connected across said source of direct current and including in series in the order named an additional inductor, a first capacitor, a first saturable inductor, a second saturable inductor, load means, and lead means, said switching circuit means being connected from the junction between the second inductor and first capacitor to said lead means, a second capacitor connected from said lead means to the junction between the first capacitor and the first saturable inductor, and a third capacitor connected from said lead means to the junction between said first and second saturable inductors, the first capacitor, first inductor, and second capacitor forming a mesh, the second capacitor, first saturable inductor, and third capacitor forming another circuit mesh, and the third capacitor, second saturable inductor, and load means forming an additional circuit mesh, current from said direct current source charging said first capacitor to a predetermined voltage while said semiconductor switch is open, the closing of the semiconductor switch causing said first capacitor to transfer its charge to said second capacitor, said second capacitor thereafter transferring its charge to the third capacitor, said third capacitor delivering a pulse to said load means, the time constants of the mesh, other mesh, and additional mesh being progressively shorter to result in a sharpened pulse to the load means.

2. In a pulse generator, in combination, a source of direct current, a first inductor connected in series with said source of direct current, a second inductor and a semiconductor switch operatively connected in series across said source of direct current and said first inductor, a load impedance, a first capacitor, and circuit means including a plurality of circuit meshes each including an additional capacitor and a saturable core inductor connecting the load impedance and the first capacitor in series across said source of direct current, said semiconductor switch normally being open whereby the current from said direct current source charges said first capacitor, the closing of the semiconductor switch causing the charge on the first capacitor to be transferred to another capacitor of one circuit mesh, the charge on said last-named capacitor supplying a pulse of current to the next adjacent mesh and charging a further capacitor of the next adjacent mesh, said last-named capacitor causing a sharpened pulse of current to be applied to said load impedance.

3. Apparatus according to claim 2 wherein said semiconductor switch is additionally characterized as being a transistor having the collector-emitter path connected in series with said inductor, and including in addition means connected to the transistor for applying control pulses between the base and emitter thereof to switch the transistor from an off to an on condition.

References Cited by the Examiner

UNITED STATES PATENTS

| | | | |
|---|---|---|---|
| 2,849,626 | 8/58 | Klapp | 307—88.5 |
| 2,851,616 | 9/58 | Thompson | 307—108 |
| 2,869,004 | 1/59 | Melville | 307—88 X |
| 2,891,173 | 6/59 | Helbig | 307—88.5 |
| 3,015,739 | 1/62 | Manteuffel | 307—88.5 |

EVERETT R. REYNOLDS, *Examiner.*

EVERETT R. REYNOLDS, *Examiner.*